US011135944B2

(12) United States Patent
Sugimoto et al.

(10) Patent No.: US 11,135,944 B2
(45) Date of Patent: Oct. 5, 2021

(54) VEHICLE SEAT

(71) Applicant: Toyota Jidosha Kabushiki Kaisha, Toyota (JP)

(72) Inventors: Takashi Sugimoto, Anjo (JP); Kohshi Katoh, Toyota (JP); Osamu Oda, Toyota (JP); Tetsuya Nagai, Okazaki (JP); Yuji Yamada, Ichinomiya (JP); Akira Takinami, Toyota (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 16/668,751

(22) Filed: Oct. 30, 2019

(65) Prior Publication Data

US 2020/0139849 A1    May 7, 2020

(30) Foreign Application Priority Data

Nov. 1, 2018    (JP) .............................. JP2018-206650

(51) Int. Cl.
*B60N 2/02* (2006.01)

(52) U.S. Cl.
CPC ........ *B60N 2/02* (2013.01); *B60N 2002/0208* (2013.01)

(58) Field of Classification Search
CPC ... B60N 2/02; B60N 2/39; B60N 2/10; B60N 2002/0208; B60N 2002/0212; B60N 2002/022; B60N 2002/0216; A47C 7/445; A47C 7/14; A47C 3/025; A47C 3/0252; A47C 3/0255; A47C 3/0257; A47C 3/027; A47D 13/105; A47D 9/02

USPC .......................................... 297/313, 314, 337
See application file for complete search history.

(56) References Cited

U.S. PATENT DOCUMENTS

| 1,488,863 | A | * | 4/1924 | Caddell ................ | A47C 3/0252 |
| | | | | | 297/266.1 |
| 2,534,386 | A | * | 12/1950 | Stewart .................... | B60N 2/38 |
| | | | | | 248/371 |
| RE24,217 | E | * | 9/1956 | Miller ....................... | B60N 2/39 |
| | | | | | 248/565 |
| 3,466,089 | A | * | 9/1969 | Stueckle ................... | B60N 2/39 |
| | | | | | 297/314 |
| 3,814,475 | A | * | 6/1974 | Slabon ................. | A47C 1/0246 |
| | | | | | 297/362.14 |

(Continued)

FOREIGN PATENT DOCUMENTS

| JP | H01-57932 U | 4/1989 |
| JP | 2014-133479 | 7/2014 |

*Primary Examiner* — James M Ference
(74) *Attorney, Agent, or Firm* — Dinsmore & Shohl LLP

(57) ABSTRACT

A seat cushion is swingable about an axis A with respect to a seat cushion support frame that is a part of a main frame. A cushion return spring that is a flat spring is disposed between the seat cushion and the seat cushion support frame so that an elastic force of the cushion return spring returns the seat cushion to a neutral position. A pair of clamp rollers that clamps the cushion return spring is disposed. The clamp rollers are movable along a longitudinal axis of the cushion return spring. Changing of a clamping position by moving the clamp rollers changes an effective length of the cushion return spring. In this way, a swingable range of the seat cushion and a force to return the seat cushion to the neutral position are changed.

3 Claims, 4 Drawing Sheets

(56) References Cited

U.S. PATENT DOCUMENTS

| | | | | | |
|---|---|---|---|---|---|
| 4,119,343 A * | 10/1978 | Pentzien | | A47C 3/0252 | |
| | | | | 297/268.1 | |
| 4,141,530 A * | 2/1979 | Ward | | A47C 3/0252 | |
| | | | | 248/592 | |
| 4,183,492 A * | 1/1980 | Meiller | | B60N 2/02 | |
| | | | | 248/395 | |
| 4,371,142 A * | 2/1983 | Bottemiller | | A47C 3/0252 | |
| | | | | 248/573 | |
| 4,500,062 A * | 2/1985 | Sandvik | | B60N 2/39 | |
| | | | | 248/371 | |
| 5,372,347 A * | 12/1994 | Minnich | | B60N 2/39 | |
| | | | | 248/371 | |
| 5,765,803 A * | 6/1998 | Graham | | B60N 2/0868 | |
| | | | | 248/624 | |
| 5,857,535 A * | 1/1999 | Brooks | | B60N 2/39 | |
| | | | | 180/41 | |
| 6,026,920 A * | 2/2000 | Obeda | | B60G 21/007 | |
| | | | | 180/41 | |
| 10,537,181 B2 * | 1/2020 | Brodbeck | | A47C 7/40 | |
| 10,799,028 B2 * | 10/2020 | Deisig | | A47C 7/445 | |
| 2002/0053822 A1 * | 5/2002 | Ware | | A47C 7/445 | |
| | | | | 297/239 | |
| 2007/0085367 A1 * | 4/2007 | Leitner | | B60N 2/1839 | |
| | | | | 296/65.09 | |
| 2007/0108820 A1 * | 5/2007 | Ueda | | F16F 1/22 | |
| | | | | 297/300.5 | |
| 2007/0108821 A1 * | 5/2007 | Ueda | | A47C 31/023 | |
| | | | | 297/301.1 | |
| 2007/0272818 A1 * | 11/2007 | Ruppe | | B60N 2/39 | |
| | | | | 248/371 | |
| 2009/0079243 A1 * | 3/2009 | Kunzler | | A47C 7/029 | |
| | | | | 297/257 | |
| 2013/0020849 A1 * | 1/2013 | Hsuan-Chin | | A47C 7/445 | |
| | | | | 297/307 | |
| 2014/0191550 A1 * | 7/2014 | Katoh | | B60N 2/06 | |
| | | | | 297/337 | |
| 2015/0130237 A1 * | 5/2015 | Takeuchi | | B60N 2/20 | |
| | | | | 297/301.1 | |
| 2015/0266448 A1 * | 9/2015 | Aoki | | B60R 22/18 | |
| | | | | 297/313 | |
| 2015/0343924 A1 * | 12/2015 | Takeuchi | | B60N 2/39 | |
| | | | | 297/314 | |
| 2015/0367756 A1 * | 12/2015 | Katoh | | B60N 2/66 | |
| | | | | 297/285 | |
| 2016/0009200 A1 * | 1/2016 | Katoh | | B60N 2/10 | |
| | | | | 296/68.1 | |
| 2016/0159254 A1 * | 6/2016 | Katoh | | B60N 2/66 | |
| | | | | 297/313 | |
| 2017/0129371 A1 * | 5/2017 | Knox | | B60N 2/39 | |
| 2017/0267145 A1 * | 9/2017 | Gonzalez Uribe | | B60N 2/686 | |
| 2018/0022238 A1 * | 1/2018 | Gonzalez Uribe | | B60N 2/68 | |
| | | | | 297/325 | |
| 2018/0070740 A1 * | 3/2018 | Pomeroy | | A47D 15/005 | |
| 2018/0072187 A1 * | 3/2018 | Katoh | | B60N 2/7076 | |
| 2018/0303241 A1 * | 10/2018 | Vetter | | A47C 9/06 | |
| 2019/0337411 A1 * | 11/2019 | Sugiyama | | B60N 2/99 | |
| 2020/0108751 A1 * | 4/2020 | Dotzler | | B60N 2/502 | |
| 2020/0139849 A1 * | 5/2020 | Sugimoto | | B60N 2/72 | |
| 2020/0269735 A1 * | 8/2020 | Nagai | | B60N 2/06 | |

\* cited by examiner

VEHICLE SEAT

CROSS REFERENCE TO RELATED APPLICATION

This application claims priority to Japanese Patent Application No. 2018-206650 filed on Nov. 1, 2018, which is incorporated herein by reference in its entirety including the specification, claims, drawings, and abstract.

TECHNICAL FIELD

The present disclosure relates to a vehicle seat, in particular to a seat cushion.

BACKGROUND

Vehicle seats whose seat cushions and seatbacks are movable with respect to vehicle seat frames are known. For example, JP 2014-133479A discloses a vehicle seat unit (1) in which a seat cushion (7) and a seatback (8) are movable with respect to a seat frame (3). JP 2014-133479A also discloses that the vehicle seat unit (1) includes a mechanism (40) that produces a restoration force that restores the seat cushion (7) back to the neutral position. This mechanism uses an elastic force of an elastic element to produce the restoration force. It should be noted that the above reference numerals in parentheses are reference numerals used in JP 2014-133479A. These reference numerals do not relate to the reference numerals used below for describing embodiments of the present disclosure.

It has been desired to change movement properties of seat cushions, such as a movable range or the strengthen of restoration force.

SUMMARY

The present disclosure enables a change in movement properties of a seat cushion in a vehicle seat with a movable seat cushion.

A vehicle seat according an embodiment of the present disclosure includes a main frame, and a seat cushion that is supported to be swingable to the right and left with respect to the main frame. The vehicle seat also includes a flat spring with one end supported by the main frame and the other end supported by the seat cushion. The flat spring biases the seat cushion to a neutral position. The vehicle seat further includes a clamp mechanism that is disposed at the main frame or the seat cushion. The clamp mechanism clamps the flat spring such that a clamping position is adjustable along a longitudinal axis of the flat spring.

An effective length of the flat spring is changed by changing the clamping position on the flat spring such that the spring constant of the flat spring and the movable range of the seat cushion are changed.

One end of the flat spring may be fixed to the seat cushion, whereas the other end of the flat spring may be supported by a support mechanism that is fixed to the main frame such that the support mechanism allows the flat spring to move relatively to the main frame along the longitudinal axis of the flat spring.

The clamp mechanism may include two clamp rollers that are movable along the longitudinal axis of the flat spring and in contact with respective front and back surfaces of the flat spring.

BRIEF DESCRIPTION OF DRAWINGS

Embodiments of the present disclosure will be described based on the following figures, wherein.

DESCRIPTION OF EMBODIMENTS

A vehicle seat 10 according to an embodiment of the present disclosure is described below with reference to the attached drawings. In the description below, unless otherwise specified, the terms describing relative positions and orientations such as front, forward, rear, rearward, left, leftward, right, rightward, up, upward, down, downward refer to relative positions and orientations from the perspective of an occupant who is sitting in the vehicle seat 10 (hereinafter referred to as a "seated occupant"). In each drawing, the arrows FR, UP, and LH indicate the front, up, and left, respectively.

Figure 1:
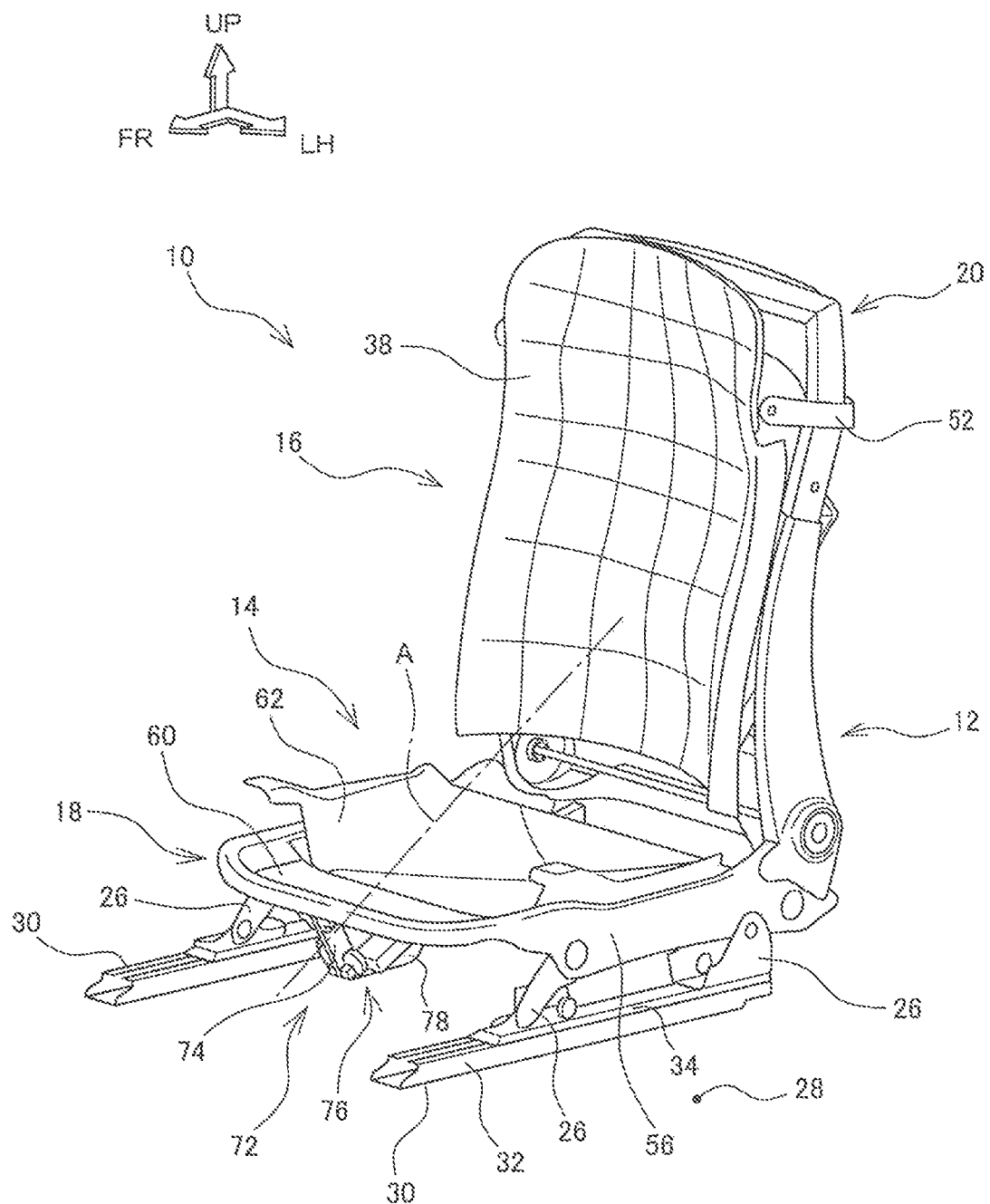
FIG. 1 is a perspective view of the front side of a vehicle seat.
Figure 2:
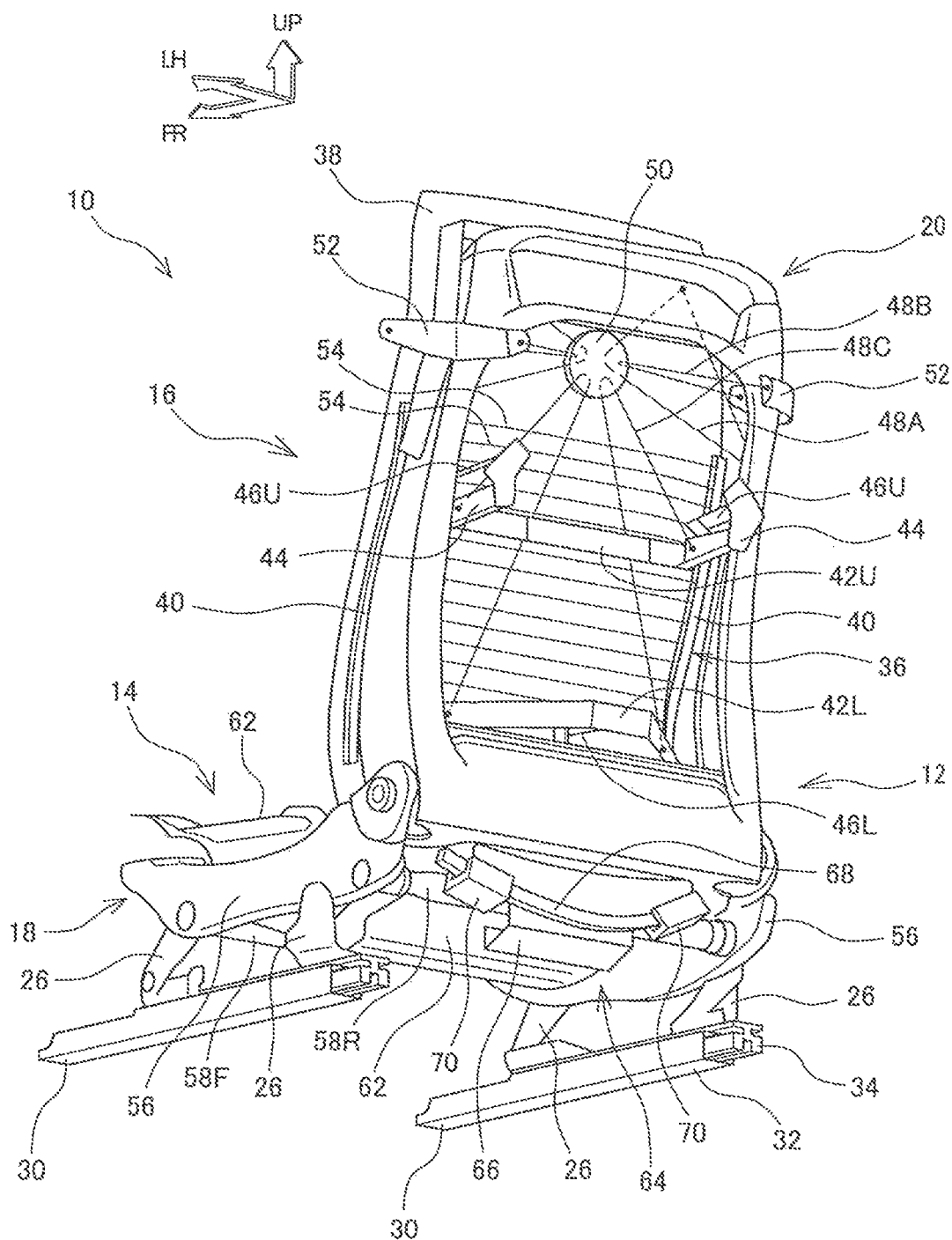
FIG. 2 is a perspective view of the back side of the vehicle seat.

FIGS. 1 and 2 are perspective views that show schematic structures of the vehicle seat 10. FIG. 1 shows the vehicle seat 10 viewed from the front upper left, and FIG. 2 shows the vehicle seat 10 viewed from the rear lower left. In FIGS. 1 and 2, some components are omitted. The vehicle seat 10 is a seat used for an automobile or other vehicles. The vehicle seat 10 includes a main frame 12 mounted directly on the vehicle body, a seat cushion 14 and a seatback 16, both of which are movably supported by the main frame 12. In FIGS. 1 and 2, the seat cushion 14 is shown with a cushion pad omitted. The seat cushion 14 supports the buttocks and the thighs of a seated occupant from below, whereas the seatback 16 supports the upper body of the seated occupant from behind.

The main frame 12 includes a seat cushion support frame 18 that supports the seat cushion 14, and a seatback support frame 20 that supports the seatback 16. The seat cushion support frame 18 includes seat legs 26 at four lower corners. The seat legs 26 are attached to a pair of seat tracks 30 that are disposed on a vehicle floor 28 and extend along a longitudinal axis of the vehicle. Each seat track 30 includes a lower rail 32 that is fixed on the floor 28, and an upper rail 34 that is slidable with respect to the lower rail 32. The seat legs 26 are attached to the upper rails 34. In this way, the vehicle seat 10 is mounted on the floor 28 to be slidable along the longitudinal axis of the vehicle. The seatback support frame 20 has an inverted U-shape when viewed from the front. Bottom ends of the seatback support frame 20 are attached to rear ends of the seat cushion support frame 18. The seatback support frame 20 is pivotally attached to the seat cushion support frame 18 such that the seatback support frame 20 is pivotable about a lateral axis of the vehicle. The tilt angle of the seatback 16 can be adjusted by pivoting the seatback support frame 20 with respect to the seat cushion support frame 18.

The seatback 16 includes a seatback frame 36 that is suspended from the seatback support frame 20, and a seatback pad 38 that is attached to the seatback frame 36. The seatback frame 36 includes a pair of vertical members 40 extending substantially along a vertical axis of the vehicle at both right and left sides of the vehicle seat 10, and two cross members 42U, 42L extending substantially along the lateral axis of the vehicle to connect the right and left vertical members 40. Of the two cross members, the upper one is referred to as an upper cross member 42U, whereas the lower one is referred to as a lower cross member 42L. The upper cross member 42U connects the two vertical members 40 at a position slightly higher up than the vertical center of the vertical members 40, whereas the lower cross member 42L connects the vertical members 40 at the bottom ends of the two vertical members 40. Spring support brackets 44 that protrude rearward are fixed at the right and left ends of the upper cross member 42U. A rear end of an upper return spring 46U that is a flat spring is fixed to the rear end of each of the spring support bracket 44, whereas a front end of the upper return spring 46U is fixed to the seatback support frame 20. A rear end of a lower return spring 46L that is a flat spring is fixed to a central portion of the lower cross member 42L, whereas a front end of the lower return spring 46L is fixed to the seatback support frame 20. The upper and lower return springs 46U, 46L that are flat springs are disposed so that the thickness direction extends substantially along the lateral axis of the vehicle. A deflection of the return springs 46U, 46L allows a rightward and leftward movement of the seatback frame 36 with respect to the seatback support frame 20. An elastic force of the upper and lower return springs 46U, 46L returns the seatback frame 36 to a neutral position that is at the lateral center of the vehicle seat 10.

The seatback frame 36 is suspended from the seatback support frame 20 via multiple suspension wires 48A, 48B, 48C. A relay disc 50 is supported by being suspended from the seatback support frame 20 with two pairs of suspension wires 48A, 48B, one pair each on the right and left, whereas the seatback frame 36 is suspended from the relay disc 50 with two suspension wires 48C, one each on the right and left. The relay disc 50 is fixed to a back surface of the seatback pad 38. Each of the suspension wires 48A is a seamlessly looped wire passing at two points on the seatback support frame 20 and passing through the relay disc 50. Both ends of each of the suspension wires 48B are connected at two points on respective shoulder brackets 52 disposed at the seatback support frame 20, and a middle portion of each of the suspension wires 48B is hooked through the relay disc 50. Each shoulder bracket 52 extends forward and rearward from the seatback support frame 20 and both ends of each suspension wire 48B are attached to the front and rear ends of the shoulder bracket 52. The lateral position of the relay disc 50 is determined by the suspension wires 48A, 48B that form respective pairs on the right and left. The pair of suspension wires 48A determines the vertical position of the relay disc 50, whereas the pair of suspension wires 48B determines the longitudinal position of the relay disc 50. One end of the pair of suspension wires 48C is attached to the upper cross member 42U of the seatback frame 36, whereas the other end is connected to the lower cross member 42L, with a middle portion hooked through the relay disc 50. The seatback 16 suspended by these wires 48A, 48B, 48C is swingable like a pendulum about an axis that extends along the longitudinal axis of the vehicle, with the relay disc 50 at the center.

Multiple cross wires 54 are disposed between the right and left vertical members 40 of the seatback frame 36 so that the cross wires 54 extend along the lateral axis of the vehicle. The cross wires 54 support the seatback pad 38 from behind to support a load from the seated occupant.

The seat cushion support frame 18 includes a pair of side members 56 that extends along the longitudinal axis of the vehicle at the right and left of the seat cushion 14, and two connecting bars 58F, 58R that connect the right and left side members 56. The side members 56 are substantially plate-shaped members that are disposed to orient the thickness direction along the lateral axis of the vehicle. Of the two connecting bars 58F, 58R, the front connecting bar 58F that is disposed on the front side connects the side members 56 at front ends of the side members 56. The rear connecting bar 58R that is disposed on the rear side connects the side members 56 at rear ends of the side members 56. The seat cushion support frame 18 further includes a front member 60 that is disposed at the front to bridge the right and left side members 56. The front member 60 is a member that has a substantially plate or tray shape and is disposed to orient the thickness direction along the vertical axis of the vehicle. The front member 60 is connected to the front end upper portions of the right and left side members 56 and protrudes, like eaves, towards the front from the front ends of the side members 56.

The seat cushion 14 includes a cushion pan 62 that is movably supported by the seat cushion support frame 18, and a cushion pad (not shown) that is attached on the cushion pan 62. The cushion pan 62 has a recess to accommodate the buttocks and the thighs of a seated occupant on the upper side. The cushion pan 62 is disposed in the seat cushion support frame 18 such that the front and the right and left of the cushion pan 62 is surrounded by the seat cushion support frame 18. The cushion pan 62 is supported by the seat cushion support frame 18 via two support mechanisms, one each on the front and rear ends. A rear support mechanism 64 that is disposed on the rear side includes a guide rail 68 that is fixed to the cushion pan 62 via a bracket 66, and sliders 70 that are fixed to the rear connecting bar 58R. The guide rail 68 has an arc shape. The sliders 70 are slidable with respect to the guide rail 68 along the arc shape. Although a front support mechanism is not shown, the front support mechanism includes an arch-shaped guide rail and sliders, similarly to the rear support mechanism 64. The guide rails and sliders of the front and rear support mechanisms are relatively movable, allowing rightwards and leftwards swing of the cushion pan 62, that is, the seat cushion 14. The seat cushion 14 is swingable about the axis A that is tilted downward at the front as shown in FIG. 1. The guide rails of the front and rear support mechanisms are positioned to allow the seat cushion 14 to swing about the axis A.

The vehicle seat 10 further includes a return mechanism 72 that returns the seat cushion 14 to a neutral position, at which the seat cushion 14 is not tilted so as to be orientated horizontal along the lateral axis of the vehicle. The return mechanism 72 is disposed at the front of the vehicle seat 10. The return mechanism 72 includes a cushion return spring 74 that is a flat spring, and a clamp mechanism 76 that changes an effective length of the cushion return spring 74. The cushion return spring 74 is positioned so that the thickness direction is oriented along the lateral axis of the vehicle. One end of the cushion return spring 74 is supported by the seat cushion support frame 18, specifically, the lower surface of the front member 60, whereas the other end is fixed to a spring fixing bracket 78 that extends from the cushion pan 62.

Figure 3:
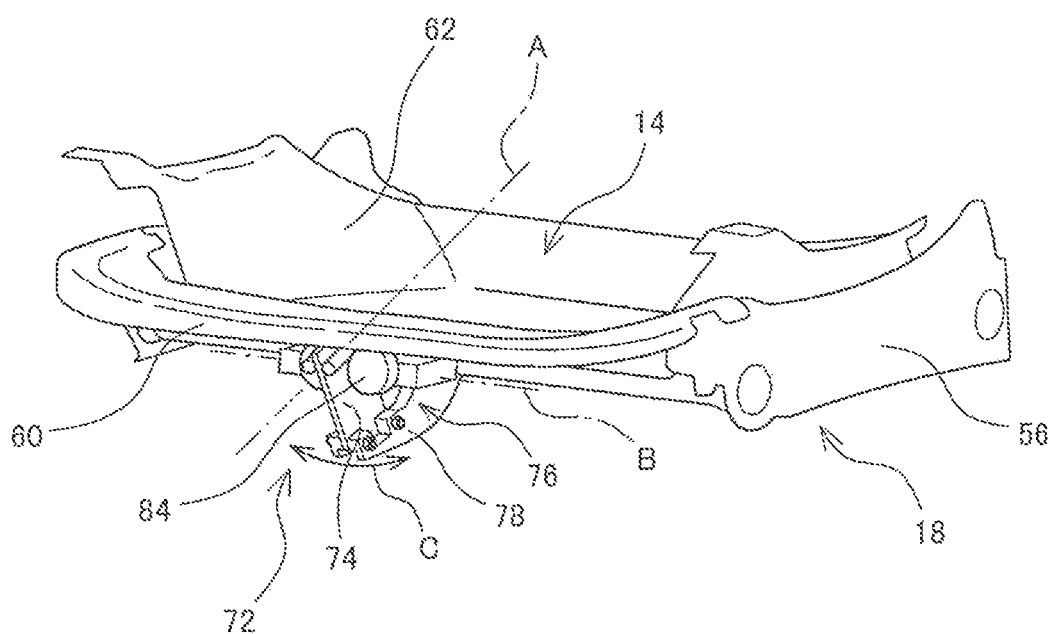
FIG. 3 is a perspective view showing details of a mechanism that returns a seat cushion to a neutral position.
Figure 4:
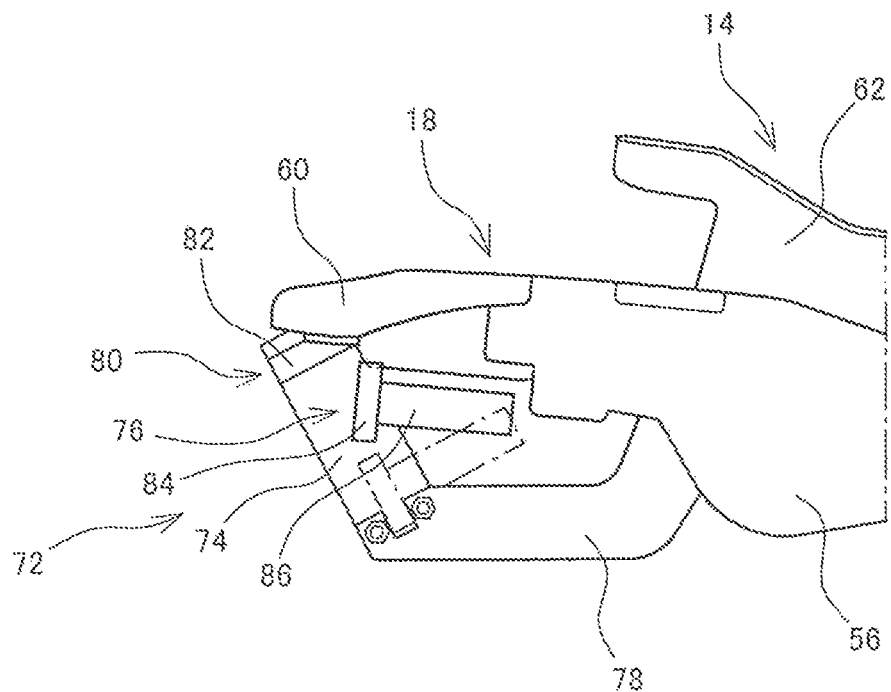
FIG. 4 is a side view showing details of the mechanism that returns the seat cushion to the neutral position.
Figure 5:
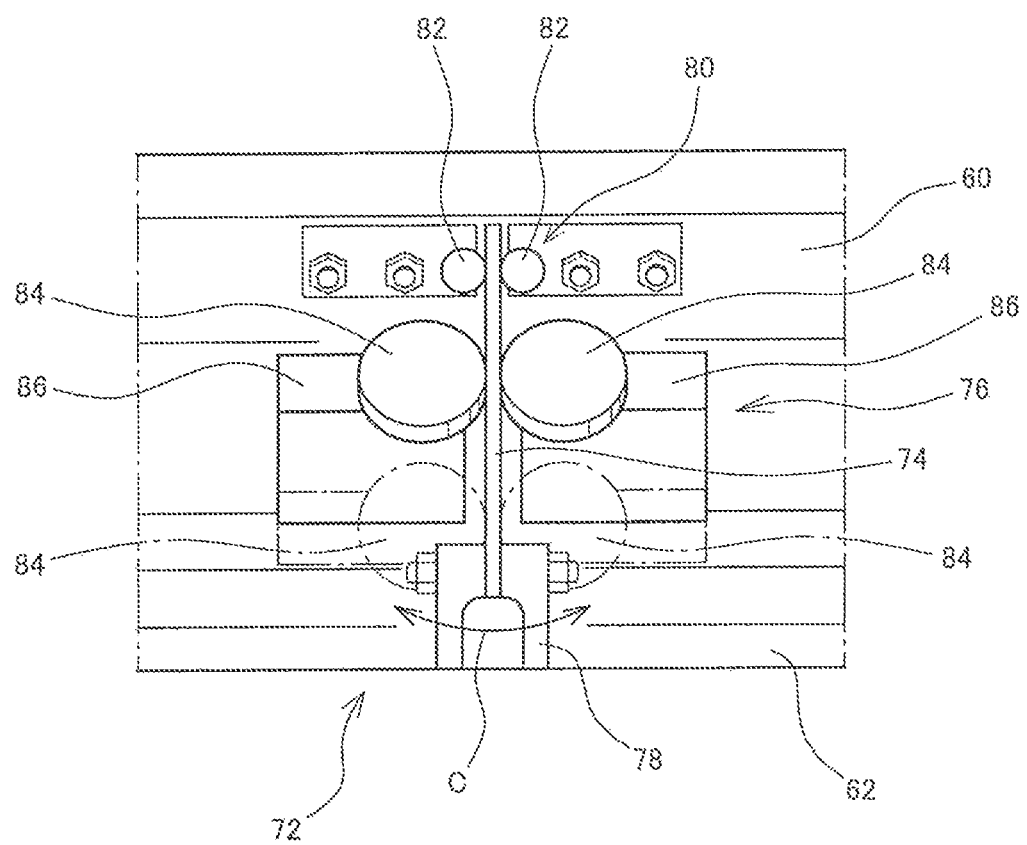
FIG. 5 is a view from a front bottom showing details of the mechanism that returns the seat cushion to the neutral position.

FIGS. 3 to 5 show details of the return mechanism 72. FIG. 3 is a perspective view of the seat cushion support frame 18, the cushion pan 62, and the return mechanism 72. FIG. 4 is a side view of the return mechanism 72, and FIG. 5 is a perspective view of the return mechanism 72 from a front bottom. The spring fixing bracket 78 is fixed at the bottom of the cushion pan 62 such that the spring fixing bracket 78 swings about the axis A unitedly with the cushion pan 62. A bottom end of the cushion return spring 74 is fixed to a front end of the spring fixing bracket 78, whereas an upper end of the cushion return spring 74 is supported by a support mechanism 80 that is disposed on the lower surface of the front member 60 of the seat cushion support frame 18. The support mechanism 80 includes a pair of support rollers 82 that are rotatably attached to the lower surface of the front member 60 on the respective front and back surfaces of the cushion return spring 74. The support rollers 82 are positioned so that the central axes of the support rollers 82 extend perpendicular to the longitudinal axis of the cushion return spring 74 to allow the cushion return spring 74 to move along a longitudinal axis of the cushion return spring 74. The structure of the support mechanism 80 is not limited to the one with the above described pair of rollers. The structure may include a pair of blocks, respectively on the front and back surfaces of the cushion return spring 74 so that the cushion return spring 74 can slidably move between the blocks. The cushion return spring 74 and the blocks on the front and back surfaces of the cushion return spring 74 may be made of a material having a low coefficient of friction. The contact surfaces between the two may be smoothed.

The clamp mechanism 76 includes a pair of clamp rollers 84, respectively disposed on the front and back surfaces of the cushion return spring 74, and roller support blocks 86 that rotatably support the clamp rollers 84. The roller support blocks 86 are disposed on the front member 60 of the seat cushion support frame 18 so that the roller support blocks 86 are pivotable about an axis B that extends along the lateral axis of the vehicle. The roller support blocks 86 do not move along a lateral axis with respect to the front member 60. Along with the pivot of the roller support blocks 86, the clamp rollers 84 at the distal ends of the roller support blocks 86 move substantially upward or downward to travel along an arc about the axis B. In FIGS. 4 and 5, the clamp roller 84 and the roller support block 86 in solid lines show the upper end position in a movable range, whereas the clamp roller 84 and the roller support block 86 in dash-dot lines show a lower end position. The position of the clamp rollers 84 may be changed by driving the roller support blocks 86 by a motor, or manually by using a mechanical linkage or other transmission mechanism.

When the seat cushion 14 swings while the clamp rollers 84 are at the upper end position in the movable range, the lower end of the cushion return spring 74 swings as shown with a double-headed arrow C in FIG. 5. This swing deflects the cushion return spring 74. The elastic force of the cushion return spring 74 causes a force (restoring force) that acts on the seat cushion 14 to return the seat cushion 14 to the neutral position. On this occasion, the portion of the cushion return spring 74 that acts as the flat spring is mainly the portion between a portion clamped by the clamp rollers 84 and the lower end portion fixed to the spring fixing bracket 78. The length (effective length) between these portions is relatively long. Thus, the swingable range (swingable width) of the seat cushion 14 is large and the spring constant of the cushion return spring 74 is low. When the clamp rollers 84 are moved downward, the effective length of the cushion return spring 74 becomes shorter such that the swingable range of the seat cushion 14 is small and the spring constant is high. When the clamp rollers 84 are moved to the lower end, because the movement of the seat cushion 14 is prevented, the seat cushion 14 is fixed.

Swingable range and spring constant of the seat cushion 14 are adjustable so that these properties can be changed in accordance with, for example, the occupant's preference.

The cushion return spring 74 may be structured such that the end of the cushion return spring 74 on the seat cushion support frame 18 side is fixed, whereas the other end on the seat cushion 14 side is supported to allow the cushion return spring 74 to move along a longitudinal axis of the cushion return spring 74. The clamp mechanism 76 may be disposed at the seat cushion 14 so that the clamp mechanism 76 swings with the seat cushion 14. In this case, the seat cushion 14 is locked when the clamp rollers 84 are at the upper end in the movable range. The clamp rollers 84 may be configured to move linearly along a longitudinal axis of the cushion return spring 74. In the place of the clamp rollers 84, elements that are not swingable may be used to clamp the cushion return spring 74. In such a case, if friction between the cushion return spring 74 and the elements that clamp the cushion return spring 74 causes a problem, the friction may be reduced by, for example, choosing a material having a low coefficient of friction or smoothing the contact portions.

The invention claimed is:

1. A vehicle seat comprising:
a main frame;
a seat cushion that is supported to be swingable to the right and left with respect to the main frame;
a flat spring with a first end supported by the main frame and a second end supported by the seat cushion, the flat spring biasing the seat cushion to a neutral position;
a clamp disposed at the main frame or the seat cushion, the clamp clamping the flat spring, and a clamping position being adjustable in a direction extending along a longitudinal axis of the flat spring; and
a support fixed to the main frame, the support supports the first end of the flat spring and allows the flat spring to move relative to the main frame in the direction extending along the longitudinal axis of the flat spring.

2. The vehicle seat according to claim 1, wherein the clamp comprises two clamp rollers that are movable along the longitudinal axis of the flat spring and in contact with respective front and back surfaces of the flat spring.

3. A vehicle seat comprising:
a main frame;
a seat cushion that is supported to be swingable to the right and left with respect to the main frame;
a flat spring with a first end supported by the main frame and a second end supported by the seat cushion, the flat spring biasing the seat cushion to a neutral position; and
a clamp disposed at the main frame or the seat cushion, the clamp clamping the flat spring, and a clamping position being adjustable along a longitudinal axis of the flat spring, the clamp comprises two clamp rollers that are movable along the longitudinal axis of the flat spring and in contact with respective front and back surfaces of the flat spring.

* * * * *